(No Model.)   2 Sheets—Sheet 1.

J. G. STONER.
FEED MECHANISM FOR SAW MILL CARRIAGES.

No. 444,321. Patented Jan. 6, 1891.

WITNESSES:

INVENTOR:

(No Model.) 2 Sheets—Sheet 2.

J. G. STONER.
FEED MECHANISM FOR SAW MILL CARRIAGES.

No. 444,321. Patented Jan. 6, 1891.

WITNESSES:

INVENTOR:
Jacob G. Stoner,
Attorneys

UNITED STATES PATENT OFFICE.

JACOB G. STONER, OF WAYNESBOROUGH, PENNSYLVANIA.

FEED MECHANISM FOR SAW-MILL CARRIAGES.

SPECIFICATION forming part of Letters Patent No. 444,321, dated January 6, 1891.

Application filed April 7, 1890. Serial No. 346,927. (No model.)

*To all whom it may concern:*

Be it known that I, JACOB G. STONER, a citizen of the United States, and a resident of Waynesborough, in the county of Franklin and State of Pennsylvania, have invented certain new and useful Improvements in Feed Mechanism for Saw-Mill Carriages; and I do hereby declare that the following is a full, clear, and exact description of the invention, which will enable others skilled in the art to which it appertains to make and use the same.

My invention relates to improvements in circular sawing machines, the object being to provide simple and economical means whereby the carriage which conveys the material or lumber to the saw may be fed forward at varying speeds, as may be desired, and which may be caused to rapidly recede to its normal position after the lumber has been operated upon.

The invention consists in the novel features of construction and new combinations of parts hereinafter fully described, and pointed out in the appended claims.

Figure 1:
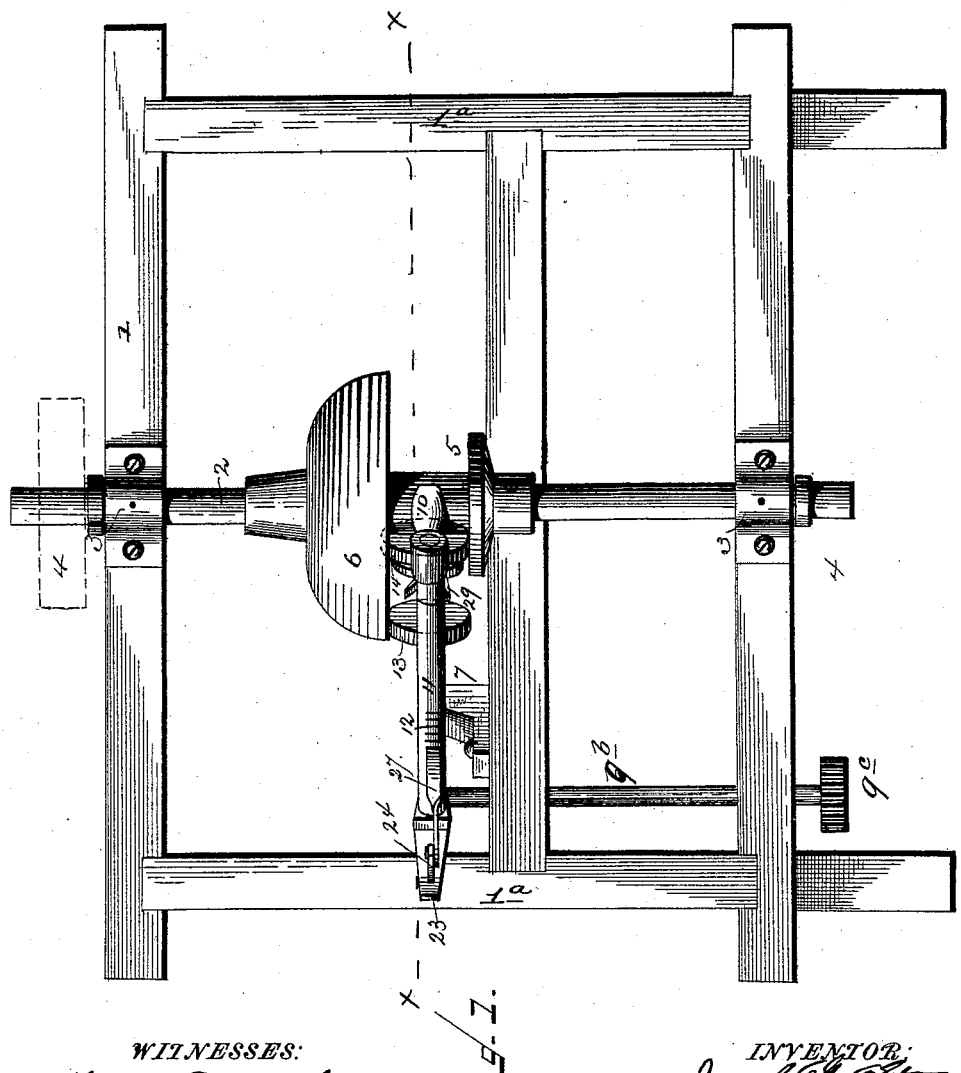
Figure 2:
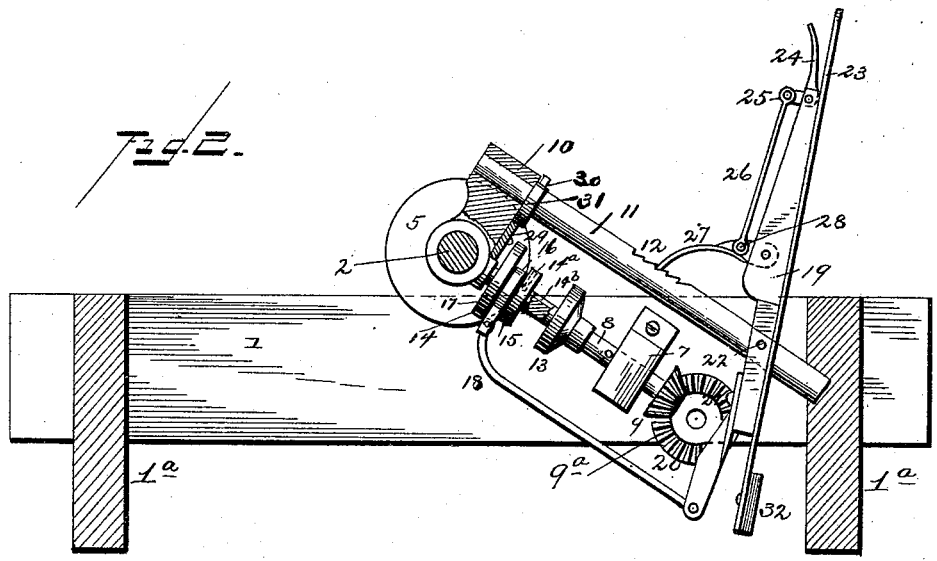
Figure 3:
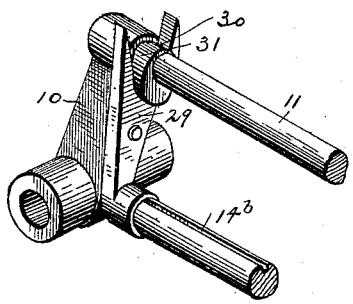

In the accompanying drawings, forming part of this specification, and in which similar reference-numerals indicate like parts in all the figures, Figure 1 represents a plan view of a feed mechanism for a sawing-machine constructed according to my invention, the carriage being removed. Fig. 2 is a section on the line $x\ x$, Fig. 1. Fig. 3 is a detail perspective view of the shifting bar and its connection.

In the said drawings the reference-numeral 1 designates the side bars of the frame of the machine, 1ᵃ the transverse bars, and 2 the saw-shaft or arbor carried thereby and revolving in bearings 3, being operated by the driving-pulley 4 from any suitable motor. Mounted upon and revolving with this shaft are the friction-disks 5 and 6, the disk 5 being the feeding-disk and disk 6 the gig-disk, the latter being much larger or of greater diameter than disk 5. Secured to one of the cross-bars of frame 1 is a bracket 7, which constitutes a bearing for the shaft 8, which is provided with a beveled pinion 9, which meshes with a similar pinion 9ᵃ on the transverse shaft 9ᵇ. This shaft at its outer end carries a cog-wheel 9ᶜ, which is adapted to mesh with a rack-bar secured to the saw-carriage, whereby said carriage may be reciprocated.

10 designates an arm embracing the saw-shaft intermediate of disks 5 and 6, and has a perforation or aperture, through which passes one end of a bar 11, whose other end is journaled in one of the transverse bars 1ᵃ, thereby securely retaining the arm 10 in position. This bar is also provided with a number of rack-teeth 12, for the purpose hereinafter described.

Rigidly secured to shaft 8, and in line with the edge of disk 6, is a disk 13, which is adapted to be thrown into frictional contact with disk 6 and impart rotary movement thereto. Secured to the upper end of shaft 8 is another disk 14, which is capable of being brought into frictional contact with disk 5 for the purpose of rotating it. This disk 14 is prevented from revolving on shaft 8 by means of feather 14ᵃ, working in groove 14ᵇ in the shaft, but may be given a reciprocating up-and-down motion thereupon by the means presently to be described, so as to bring it nearer to or farther from the center of disk 5, and thus varying the speed of shaft 8, it being obvious that the nearer the center of disk 5 the point of contact of disk 14 the less the speed of the latter. Disk 14 is formed with a flanged hub 15 and a groove 16, within which works the circular strap 17, secured to the upper end of the bar or rod 18. This rod 18 serves to reciprocate disk 14 on the shaft 8, and is connected to a lever 19 by means of an arm 20, pivoted at 21 to said lever 19, and the latter is fulcrumed at 22 to bar 11, so that said bar can be oscillated thereby and at the same time the lever be moved upon its fulcrum or pivot. At its upper end lever 19 is formed into a handle 23 and has pivoted thereto the bent lever 24, the short arm 25 of which is pivoted to the vertical bar 26, connected with the pawl 27, pivoted at 28 to lever 19. The free end of this pawl engages with the teeth 12 of the bar 11.

Pivoted near its center to the arm 10 is a shifting bar 29, having an opening or aperture 30 at its lower end, which forms the bearing for the upper end of shaft 8. The upper end of the shifting bar is bifurcated so as to embrace a cam 31, firmly secured to the upper end of bar 11, so as to oscillate therewith.

32 designates a weight upon the lower end of lever 19, by which said lever is held in an upright position, so as to keep both disks 13 and 14 normally out of contact with disks 4 and 5.

The operation of the machine is as follows: The lumber to be sawed having been placed upon the carriage and suitably dogged thereupon, the lever 19 is turned to the right, so as to oscillate bar 11, which, by means of cam 31, moves the bar 29 on its pivot, causing the disk 14 to be brought into frictional contact with the revolving disk 5 on the saw-arbor and imparting rotary motion to shaft 8, which causes the carriage to be fed toward the saw by means of pinion 9 and its connections. The speed at which shaft 8 is rotated may be regulated by moving the disk 14 nearer to or farther from the center of disk 5 by means of the strap 17, rod 18, arm 20, and lever 19, as will be obvious. After the saw has performed its work and it is desired to have the carriage recede to its normal position, shaft 8 is shifted in the opposite direction, so as to bring disk 13 in contact with gig-disk 6, which will cause said shaft to be rotated in a reverse direction and the carriage be moved back. The pawl 27, engaging with the teeth 12 of the bar 11, holds the lever 19 in its position with reference to disk 14.

I am aware that friction-disks on the saw shaft or arbor have heretofore been employed to actuate saw-mill carriages through the intermediary of rack and pinions and shaft and friction-disks working in contact with the friction-disks on the saw-arbor, and such I do not broadly claim. In said previous arrangements the friction-disks on the pinion-shaft have been made or so formed as to be practically integral with each other, so that a reciprocating movement given to one was communicated to the other. This was found very objectionable in practice, owing to various reasons, which will be apparent to those skilled in the art. By my invention, however, the said disks are separate and distinct from each other, thereby rendering the operation of throwing them in and out of contact with the saw-arbor or driving-disks less laborious and awkward and more reliable.

Having thus described my invention, I desire to secure by Letters Patent of the United States—

1. In a sawing-machine, the combination, with the disks 5 and 6 and the shaft 8, having the disks 13 and 14, of the oscillating bar 11, having cam 31, the pivoted shifting bar 29, bifurcated at one end to receive the cam 31 and perforated at the other end to form a bearing for the upper end of shaft 8, and means for oscillating bar 11 and reciprocating disk 14, substantially as described.

2. The combination, with saw-arbor 2, disks 5 and 6, mounted thereon, shaft 8, having fixed disk 13 and reciprocating disk 14, provided with feather $14^a$, working in groove $14^b$ in shaft 8, and with hub 15 and groove 16, of the bar 11, having cam 31, the shifting bar 29, and the lever 19, fulcrumed to bar 11 and connected with strap 17, working in groove 16 of disk 14, substantially as described.

3. The combination of the saw-arbor 2, disks 5 and 6, mounted thereon, shaft 8, disks 13 and 14, oscillating bar 11, having cam 31, shifting bar 29, and lever 19, fulcrumed to bar 11 and having weight 32 and connected with disk 14, substantially as described.

4. The combination of the saw-arbor 2, disks 5 and 6, shaft 8, disks 13 and 14, oscillating bar 11, having teeth 12 and cam 31, shifting bar 29, lever 19, having bar 26 and pawl 27, the weight 32 and 20, rod 18, and strap 17, working in groove 16 in disk 14, substantially as described.

In testimony that I claim the foregoing as my own I have hereunto affixed my signature in presence of two witnesses.

JACOB G. STONER.

Witnesses:
SIMON LE CROW,
D. C. SHANK.